United States Patent [19]
Norrod et al.

[11] Patent Number: 5,801,720
[45] Date of Patent: *Sep. 1, 1998

[54] DATA TRANSFER FROM A GRAPHICS SUBSYSTEM TO SYSTEM MEMORY

[75] Inventors: Forrest E. Norrod; Willard S. Briggs, both of Boulder; Christopher G. Wilcox, Ft. Collins; Brian D. Falardeau, Boulder; Sameer Y. Nanavati, Longmont, all of Colo.

[73] Assignee: National Semiconductor Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 604,008

[22] Filed: Feb. 20, 1996

[51] Int. Cl.$^6$ ............................................. G06F 13/00
[52] U.S. Cl. ..................... 345/526; 345/512; 345/516; 711/147; 711/202
[58] Field of Search ..................... 395/501, 503, 395/511, 512, 515, 520, 521, 525, 526, 480, 566, 842; 345/501, 503, 511, 512, 515, 520, 521, 525, 526; 711/6, 147–153, 202–207

[56] References Cited

U.S. PATENT DOCUMENTS

| | | | |
|---|---|---|---|
| 5,046,023 | 9/1991 | Katsura et al. | 395/134 |
| 5,313,577 | 5/1994 | Meinerth et al. | 395/515 |
| 5,321,810 | 6/1994 | Case et al. | 395/515 |
| 5,369,744 | 11/1994 | Fukushima et al. | 395/501 |

OTHER PUBLICATIONS

"Cx486DX/DX2™ 3 And 5 Volt Microprocessors" Data Book, Mar. 1994 (p. ii–iii, pp. Introduction, 2–7–2–8, 2–15–2–21, 2–50, 2–59–2–61).

"A Display System for the Stellar Graphics Supercomputer Model GS1000™," Apgar, Bersack, & Mammen, Computer Graphics, vol. 22 No. 4, Aug. 1988.

Primary Examiner—Matthew M. Kim
Assistant Examiner—U. Chauhan
Attorney, Agent, or Firm—Andrew S. Viger; John L. Maxin

[57] ABSTRACT

A processing system includes a graphics subsystem that directly renders raster data to system memory and moves bitmaps between locations within system memory with the graphics subsystem providing the data and a processor providing the virtual-to-physical addresses with privilege and protection check mechanisms.

10 Claims, 4 Drawing Sheets

DATA TRANSFER FROM A GRAPHICS SUBSYSTEM TO SYSTEM MEMORY

BACKGROUND OF THE INVENTION

1. Field of the Invention

The invention generally relates to data movement in a computer system, and more particularly to a system and method of moving data from a graphics subsystem to system memory.

2. Description of Related Art

Figure 1:
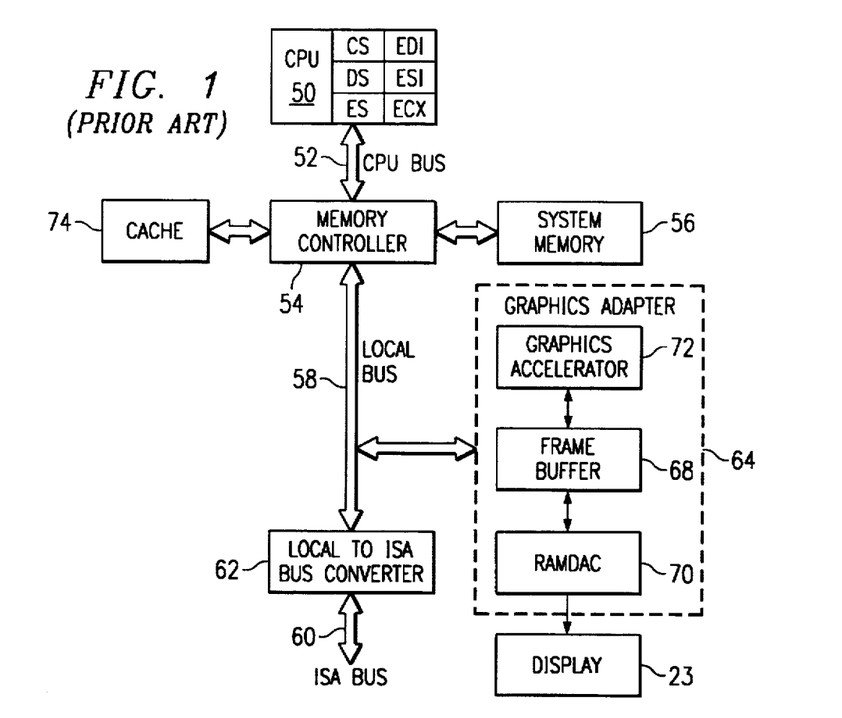
FIG. 1 is a prior art block diagram of a processing system that employs a graphics accelerator.

Reference is made to FIG. 1 which depicts a typical personal computer (PC) system with an x86 architecture. A central processing unit (CPU) 50 having multiple registers (e.g. CS, DS, ES ... ECX, EDI, ESI) is coupled through a CPU bus 52 to a memory controller 54. The memory controller 54 is coupled to system memory 56, typically DRAM, and to a relatively fast so-called local or "mezzanine" bus 58, typically having a protocol in accordance with the Video Electronics Standards Association VL-bus or with the Peripheral Component Interconnect (PCI) bus. The local bus 58 is coupled to a relatively slow Industry Standard Architecture (ISA) bus 60 through a bus converter 62.

The local bus 58 couples a graphics adapter card 64 to the memory controller 54 and to the bus converter 62. The location and color for each pixel displayed on display 23 (e.g. "the raster") is stored in a frame buffer memory 68 on the graphics adapter card 64. A RAMDAC 70 on the graphics adapter card 64 converts the data stored in the frame buffer memory 68 to analog signals to drive the display 23 which is typically a cathode ray tube (CRT) or a liquid crystal display (LCD). Each time a change is made in the raster on display 23, the location and color for each pixel must be re-calculated and stored in the frame buffer memory 68.

The CPU 50, typically through execution of a so-called "device driver" (described in more detail hereinbelow), calculates the location and color definition of each changed pixel and sends the resulting information across the local bus 58 to the frame buffer memory 68 on the graphics adapter card 64. Alternatively, specialized circuitry known as a "graphics accelerator" 72 reduces the burden from the CPU 50 by receiving certain graphic primitives (e.g. fills and line draws) through the device driver executed by the CPU 50, to calculate the changes in the pixels and to fill the frame buffer memory 68 with updated raster data.

Figure 2:
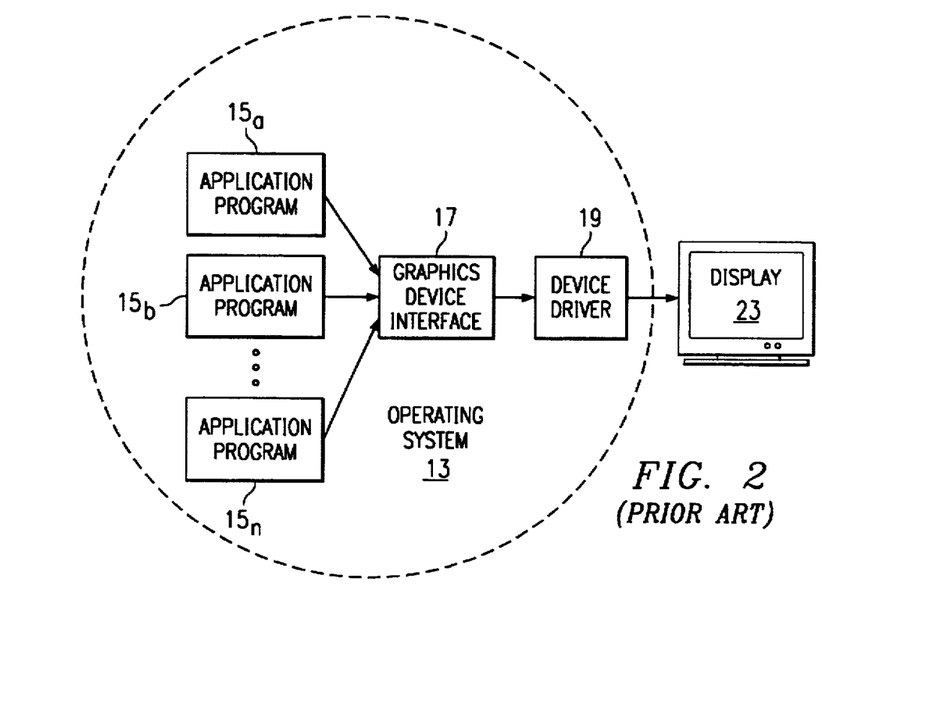
FIG. 2 is a prior art block diagram of selected portions of a multi-tasking operating system which executes on the processing systems depicted in FIGS. 1 and 3.

Reference is now made to FIG. 2 which depicts selected elements of a multi-tasking operating system 13, such as Microsoft® Windows® or IBM OS/2®, executed by the system depicted in FIG. 1. A plurality of application programs $15_a$–$15_n$, running under the operating system 13 perform graphical functions by making calls through a graphics device interface (GDI) 17, provided by the operating system 13. Specifically, the GDI 17 provides a uniform graphics language to allow the operating system 13 to achieve the so-called device-independent graphics "primitive" operations, including, but not limited to, rendering of vectors, rectangles, polygons, raster text, and bit maps. A call made to the GDI 17 is then translated into a hardware-dependent device driver 19 to produce a format suitable for final output to the display 23. Expressed simply, the device driver 19 is a series of instructions particularly tailored for individual hardware configurations to insulate the GDI 17 from the details of the specific hardware.

Accordingly, application programs $15_a$–$15_n$ remain constant from one hardware platform to another with only the device driver 19 changing to accommodate the different hardware options. An exemplary, but not exclusive, GDI 17 is described in detail in the *Microsoft Windows Programmer's Reference, Volumes* 1–3, dated 1987, by the Microsoft Corporation, said Programmer's Reference herein incorporated by reference.

By way of further background, the operating system 13 typically allows the application programs $15_a$–$15_n$ to perform any graphic "primitive" function on either the frame buffer 68 or a bitmap stored in system memory 56. Consequently, the device driver 19 must be able to transfer pixel data to the frame buffer 68 and also to manipulate the bitmap stored in system memory 56. If the graphics accelerator 72 is employed however, pixel data cannot be directly transferred to the bitmap stored in system memory 56 since the graphics accelerator 72 is ignorant about, inter alia, virtual memory addressing. Consequently, even if the graphics accelerator 72 is used, the device driver must also include additional instructions to emulate the graphics accelerator 72 writing pixel data directly to a bitmap stored in system memory 56.

More specifically, the BitBlt ("bit-block transfer") primitive transfers blocks of graphics data from: system memory 56 to frame buffer memory 68, frame buffer memory 68 to system memory 56, and between different portions within the frame buffer memory 68. The graphics accelerator 72 can effectively handle the BitBlt primitive to the extent that data is already stored in and the destination is also in the frame buffer memory 68. The CPU 50 however, must still be involved to provide virtual-to-physical address translation and privilege and protection checks if the BitBlt primitive requires bitmapped images to be moved from the graphics accelerator 72 to the external system memory 56. The CPU 50 may handle this through recursive steps in the device driver, which in x86 architecture parlance, can be a repeat move string instruction of the form:

REP MOVS [ESI(source address),EDI(destination address)]

wherein a number of bytes, words, or Dwords of data specified by the ECX register starting at an address pointed to by ESI are moved to a block of memory pointed to by EDI.

The required intervention by the CPU 50 has a large latency associated with it since data must be read by the memory controller 54 from the frame buffer 68 on the graphics adapter card 64 through the local bus 58 over the CPU bus 52 into the internal registers of the CPU 50. The CPU 50 must then turnaround and write the data from its registers over the CPU bus 52 through the memory controller 54 to the system memory 56.

Accordingly there is a need for a system and a method of transferring data from a graphics subsystem to both a frame buffer and a bitmap stored in system memory with the graphics subsystem providing the raster data and a processor providing the virtual-to-physical address translation with privilege and protection check mechanisms.

SUMMARY OF THE INVENTION

To overcome the limitations of the prior art described above, and to overcome other limitations that will become apparent upon reading and understanding the present specification, the present invention discloses systems and methods of seamless transfer of data from a graphics subsystem directly to an external memory. The present invention employs a graphics subsystem and a processor which along with an executable instruction, synchronizes virtualto-physical addresses generated by the processor with pixel data generated by the graphics subsystem to transfer the pixel data from the graphics subsystem to the external memory, while maintaining protection and privilege checks on the physical addresses in external memory.

A feature of the present invention is increased throughput by transferring data directly from the graphics subsystem to system memory while maintaining virtual-to-physical address translation and protection and privilege check mechanisms.

Another feature of the present invention is reduced bus activity thus reduced power consumption, through parallelism of supplying data from an integrated graphics subsystem and virtual-to-physical addresses from the processor.

Another feature of the present invention is rendering raster data directly from the graphics subsystem to system memory without first storing the raster data in a frame buffer.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods of transferring data from a graphics subsystem to system memory, practiced in accordance with the present invention.

DESCRIPTION OF THE PREFERRED EMBODIMENT

The detailed description of the preferred embodiment for the present invention is organized as follows:
1. Exemplary Processing System
2. Exemplary Graphics Pipeline
3. Exemplary Instruction
4. Exemplary Graphics Device Driver
5. Conclusion This organizational table, and the corresponding headings used in this detailed description, are provided for the convenience of reference only and are not intended to limit the scope of the present invention. It is to be understood that while the preferred embodiment is described hereinbelow with respect to the x86 computer architecture, it has general applicability to any architecture. Certain terminology related to the x86 computer architecture (such as register names, signal nomenclature, etc.) which is known to practitioners in the field of microprocessor design, is not discussed in detail in order not to obscure the disclosure.

Moreover, structural details which will be readily apparent to those skilled in the art, having the benefit of the description herein illustrated in the drawings by readily understandable block representations and flow diagrams, showing and describing only those details that are pertinent to the present invention. The block and flow diagrams in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

1. Exemplary Processing System

Figure 3:
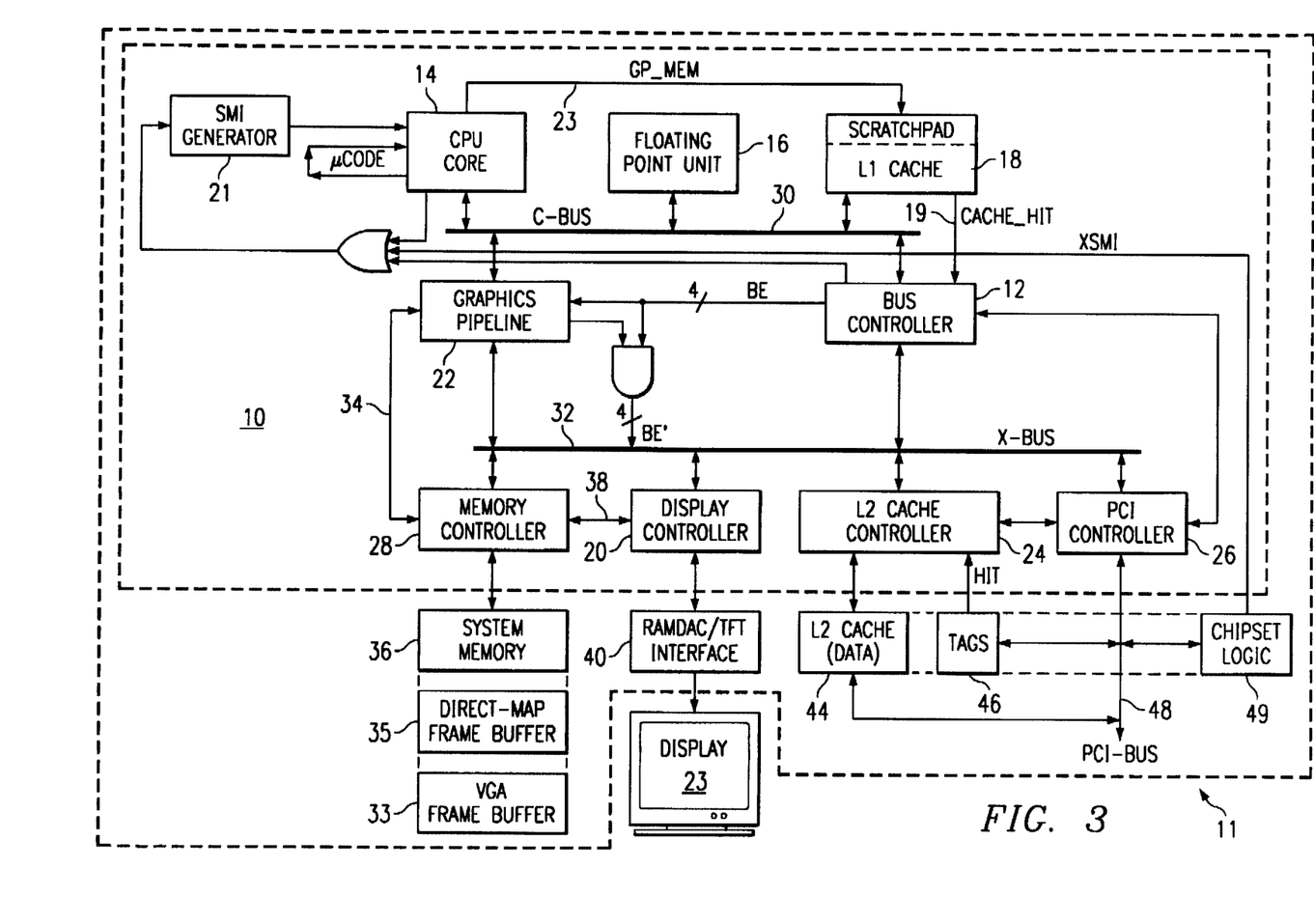
FIG. 3 is a block diagram of a processing system practiced in accordance with the principles of the present invention.

Reference is now made to FIG. 3 which depicts an exemplary, but not exclusive processing system employing a method of transferring data, practiced in accordance with the principles of the present invention. A system circuit board 11 (a.k.a. motherboard) preferably includes buses to couple together a CPU 10, system memory 36, a RAMDAC/ thin film transistor display panel interface 40, L2 cache 44, and chipset logic circuitry 49. A multi-tasking operating system program such as, but not limited to, Microsoft® Windows® or IBM OS/2®, preferably executes on the CPU 10 to manage primary operations.

The CPU 10 preferably includes the following functional units: an internal bus controller 12, a CPU core 14, a (level-one) L1 cache 18—part of which is partitionable as a scratchpad memory, a memory controller 28, a floating point unit (FPU) 16, a display controller 20, an internal SMI generator 21, a graphics pipeline 22, a (level-two) L2 cache controller 24, and a PCI-bus controller 26.

The bus controller 12, the CPU core 14, the FPU 16, the L1 cache 18, and the graphics pipeline 22, are coupled together through an internal (with respect to the CPU 10) C-bus 30 whose exact configuration is not necessary for the understanding of the present invention. The bus controller 12, display controller 20, the graphics pipeline 22, the L2 cache controller 24, the PCI-bus controller 26, and the memory controller 28 are coupled together through an internal (with respect to the CPU 10) X-bus 32.

The details of the C-bus 30 and X-bus 32 are not necessary for the understanding of the present invention. It is sufficient to understand that independent C and X buses 30 and 32 decouple these functional units within the CPU 10 so that for example, the CPU core 14, the FPU 16, and L1 cache 18 can operate substantially autonomously from the remainder of the CPU 10 and so that other activities (e.g. PCI-bus transfers, L2 cache transfers, and graphics updates) can be conducted independently. More specifically, the C-bus 30 has sufficient bandwidth to allow the graphics pipeline 22 to access the scratchpad memory while the CPU core 14 is performing an unrelated operation.

The CPU core 14 in the preferred embodiment is a six stage pipeline. The exact details of the CPU core 14 pipe stages however, are not important for the understanding of the present invention. It is sufficient to understand that a plurality of bytes are fetched into a buffer during the instruction fetch (first) stage, decode and scoreboard checks are performed during the instruction decode (second) stage, linear memory address calculations are performed during a pre-address calculation (third) stage, physical address calculations are performed during an address translation (fourth) stage, instructions are executed during the execution (fifth) stage, and the results of the instruction execution are written to write buffers during the writeback (sixth) stage. Those skilled in the art, with the aid of the present disclosure, will recognize other number of stages for the pipeline and other configurations for the CPU core 14 without departing from the scope of the present invention.

The L1 cache 18 is preferably, although not exclusively, a 16 K byte unified data/instruction cache that operates in either a write-through or write-back mode. An area of the L1 cache 18 can be programmably partitioned as the scratchpad memory through configuration control registers (not shown) in the CPU core 14. Scratchpad control circuitry in the L1 cache 18 includes data pointers which can be used by either the CPU core 14 or the graphics pipeline 22 to access data in the scratchpad memory. The scratchpad memory may also be addressed directly by the CPU core 14.

An exemplary, but not exclusive, use for the scratchpad memory is as a blit buffer for use by the graphics pipeline 22. More specifically, in performing a BitBlt, a raster line (scanline) or portion thereof, of data is read from the direct-mapped frame buffer 35 (preferably in system memory 36), written to the blit buffer partitioned out of the L1 cache 18, and then read back out and written to another region of the direct-mapped frame buffer 35. System programs, such as a graphics device driver, which are executed by the CPU core 14 can also directly put data into the blit buffer and have the graphics pipeline 22 autonomously read it out and put it in the direct-mapped frame buffer 35 or system memory 36.

The preferred L1 cache 18, along with other exemplary applications for the scratchpad memory, are described in co-pending U.S. patent application Ser. No. 08/464,921, filed Jun. 5, 1995, entitled "Partionable Cache", assigned to the Assignee of the present invention and herein incorporated by reference. It is to be understood however, that the L1 cache 18 may be larger or smaller in size or may have a Harvard "split" architecture without departing from the scope of the present invention. It is also to be understood that the scratchpad memory may be a memory separate for the L1 cache 18 without departing from the scope of the present invention.

The graphics pipeline 22 is coupled to the memory controller 28 through a dedicated bus 34 that expedites block moves of data from the scratchpad memory (blit buffer) through the graphics pipeline 22 to the VGA frame buffer 33 or to the direct-mapped frame buffer memory 35, which in the preferred embodiment, resides as part of system memory 36. The direct-mapped frame buffer memory 35 is addressed through the memory controller 28 producing a base address and the graphics pipeline 22 producing an offset, avoiding protection and privilege checks normally associated with address generation.

BitBlt operations of the graphics pipeline 22 are initiated by writing to control registers (not shown) in the graphics pipeline 22 which specifies: i) the type of source data required, if any, direct-mapped frame buffer 35, or blit buffer; ii) the type of destination data required, if any, direct-mapped frame buffer 35, or blit buffer; iii) where the graphics pipeline 22 writes the data, direct-mapped frame buffer 35, or system memory 36, and iv) a source expansion flag. When the source is a bitmap image in system memory 36, the data is loaded from system memory 36 into the blit buffer before starting the BitBlt operation. An exemplary, but not exclusive, method of loading data from system memory 36 to the blit buffer is described in co-pending U.S. patent application Ser. No. 08/540,300, Attorney's Docket No: CX00246, filed Oct. 06, 1995, entitled "Data Transfer With Cacheability Control", assigned to the Assignee of the present invention and herein incorporated by reference. If the BitBlt operation requires destination data, the graphics pipeline 22 loads the blit buffer with destination data from the frame buffer 35 before rendering to system memory 36.

The internal bus controller 12 coordinates and prioritizes transfers between the C and X buses 30 and 32, respectively. The memory controller 28 controls main system memory 36 and cooperates with the internal bus controller 12 to determine cacheability and permits all DMA cycles to automatically snoop the L1 cache 18 and the L2 cache 44. The FPU 16 performs floating point operations.

The display controller 20 which is coupled to the memory controller 28 through a dedicated bus 38, retrieves image data from the direct-mapped frame buffer memory 35, performs a color look-up if required, inserts cursor and icon overlays into a raster data stream, generates timing, and formats the raster data for output to the RAMDAC/Thin Film Transistor (TFT) display interface 40 which in turn drives a display 23.

The L2 cache controller 24 and PCI controller 26 collectively provide, inter alia, a high speed interface for an "off-chip" L2 cache 44 (with respect to the CPU 10). The preferred, although not exclusive, L2 cache interface is described in co-pending U.S. patent application Ser. No. 08/522,219, Attorney's Docket No: CX00249, filed Aug. 31, 1995, entitled "L2 Cache Interface", assigned to the Assignee of the present invention and herein incorporated by reference. It is to be understood however, that other forms for the L2 cache interface may be practiced without departing from the scope of the present invention. It should also be understood that while the L2 cache 44 shares the same physical data, address, and control lines on the PCI-bus 48, that for performance reasons, the clock speed and communication protocol are not necessarily related to the PCI protocol. Data accesses to the L2 cache 44 are mutually exclusive with other "PCI-like" PCI-bus 48 accesses, however, writes to the PCI-bus 48 do access the cache tag and control logic circuitry 46 and invalidate the tag on a hit.

In the preferred embodiment, the cache tag and control logic circuitry 46, which determines whether a hit/miss has occurred, is provided separately from the data cache 44 in external chipset logic circuitry 49. Those skilled in the art will recognize other forms and arrangements for the cache tag and control logic circuitry 46, such as, but not limited to, integrated circuitry onto the CPU 10, without departing from the scope of the present invention.

The SMI generator 21 receives a first input from the CPU core 14, a second input from the internal bus controller 12, and a third input (XSMI) from a source external to the CPU 10, preferably from the chipset logic circuitry 49. Chipset logic circuitry 49 is coupled to the PCI-bus 46 and preferably has interface logic including, but not limited to, FIFO buffers for receiving incoming and outgoing data and indicators to indicate fullness of a given buffer. The chipset logic circuitry 49 preferably also includes comparators and other trap circuitry to detect and indicate the occurrence of predetermined events outside the CPU 10.

2 Exemplary Graphics Pipeline

Figure 4:
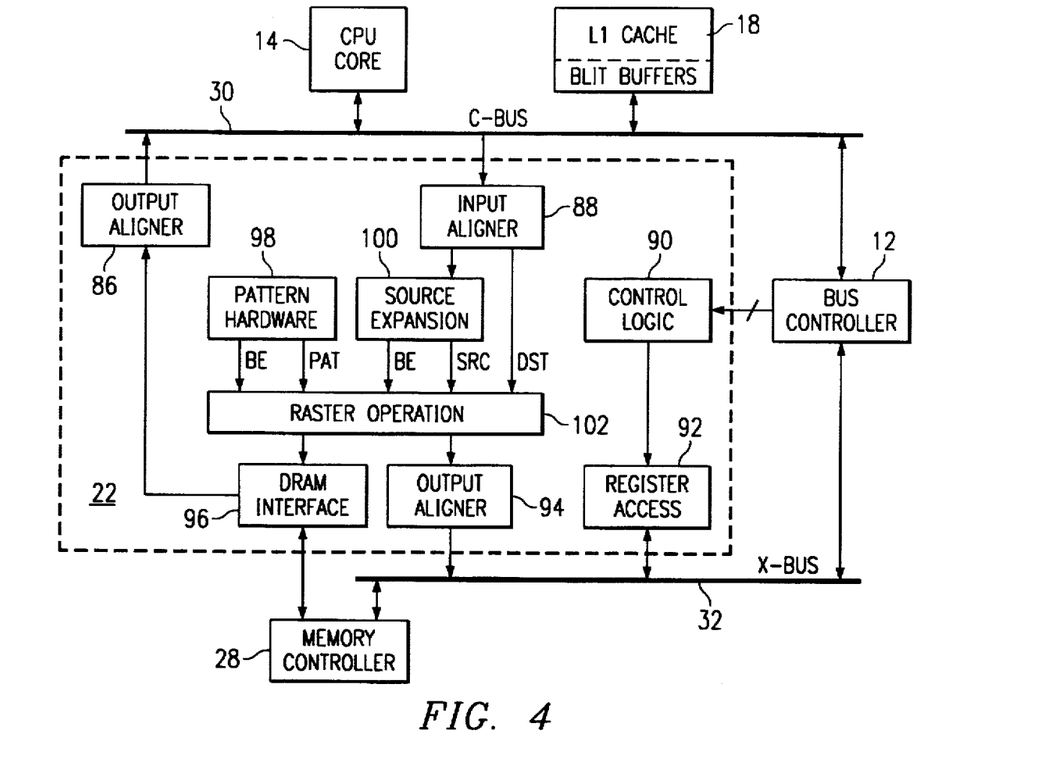
FIG. 4 is a detailed block diagram of the graphics pipeline depicted in FIG. 3.

Reference is now made to FIG. 4 which depicts a more detailed block diagram of the graphics pipeline 22, practiced in accordance with the principles of the present invention. The graphics pipeline 22 includes: output aligner circuitry 86 for aligning data from the DRAM interface circuitry 96 onto the C-bus 30, input aligner circuitry 88 for aligning data from the C-bus 30 to the source expansion circuitry 100 and to the raster operation circuitry 102, control logic circuitry 90 coupled to receive control signals from the bus controller 12 for signaling when the X-bus 32 is driven with a valid address for writing a bitmap into system memory 36, register access circuitry 92 for reading and writing control registers from the X-bus 32, output aligner circuitry 94 for aligning data from the raster operation circuitry 102 onto the X-bus 32, DRAM interface circuitry 96 for interfacing to the memory controller 28, pattern hardware circuitry 98 for executing pattern primitives such as monochrome, dithered, and color patterns, source expansion circuitry 100 for color expansion of source data, primarily text, wherein pixels corresponding to a clear bit in the source data are rendered using a color specified in a first preselected register while pixels corresponding to a set bit in the source data are rendered using a color specified in a second preselected register, and raster operation circuitry 102, for specifying how the pattern data, source data, and destination data are combined to produce the output to the output aligner 94. The graphics pipeline 22 provides transparency which is applied to graphics data such as raster fonts. During color expansion of monochrome graphics data, pixels are expanded to either full color depth or are made transparent.

The pattern hardware circuitry 98 provides byte enable (BE) and pattern (PAT) description signals to raster operation circuitry 102. The source expansion circuitry 100 provides byte enable (BE) and source (SRC) description signals to raster operation circuitry 102. The input aligner circuitry 88 from the C-Bus 30 provides destination (DST) description signals to raster operation circuitry 102.

3 Exemplary Instruction

The preferred, although not exclusive, application of the present invention is moving graphics data from the graphics pipeline 22 to system memory 36. Accordingly, a mnemonic GP_MEM is used to describe an instruction executable by the CPU core 14 to move data from the graphics pipeline 22 to system memory 36. The execution of the GP_MEM instruction does not change any flags in a flag register in the CPU core 14 but does however, generate protection and privilege check exceptions as appropriate, including, but not limited to, a general protection fault for illegal memory addresses and for page faults. The flag register and the presently preferred protection and privilege check mechanisms are described in detail in the *Cx486DX/DX2™3 and 5 Volt Microprocessor Data Book*, dated Mar. 1994, by the Cyrix Corporation of Richardson, Tex., the Assignee of the present invention, said data book herein incorporated by reference.

The GP_MEM instruction interlocks the CPU core 14 and the graphics pipeline 22 to provide address and data information, respectively. In the preferred embodiment, the GP_MEM instruction is adapted for use with the x86 computer architecture and is treated by the CPU core 14 as having an inherent REP (repeat prefix).

Figure 5:
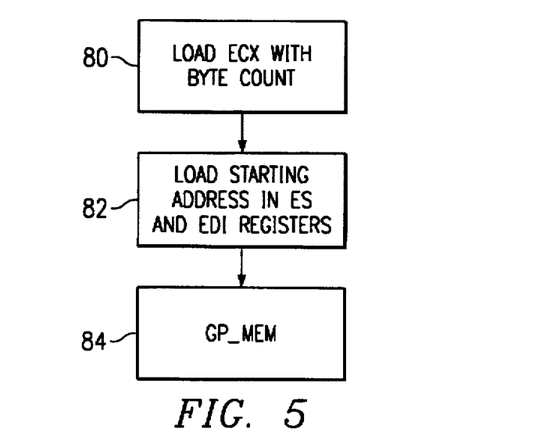
FIG. 5 is a flow diagram of a series of steps for an instruction practiced in accordance with the principles of the present invention.

Reference is now made to FIG. 5 which depicts a flow diagram of the steps for the GP_MEM instruction.

The preferred syntax for the GP_MEM instruction is:

GP_MEM byte count, starting memory address

In accordance with x86 architecture principles, the number of bytes to transfer from the graphics pipeline 22 is loaded into the ECX register in the CPU core 14 at step 80. At step 82, the address in system memory 36 is specified in the ES and EDI registers of the CPU core 14 permitting no segment override. It should noted that the GP_MEM instruction could also include a step of specifying a destination address, without departing from the scope of the present invention. At step 84, the CPU core 14 executes the GP_MEM instruction recursively (through microcode) decrementing the contents of ECX and incrementing the contents of EDI until the specified byte count of data from the graphics pipeline 22 is moved into system memory 36. The GP_MEM instruction transfers byte data from the start address to the next Dword aligned boundary. Microcode executed by the CPU core 14 transfers full Dwords until the end of the address range, where several byte transfers may be necessary to complete the transaction. The resultant transfer provides protection check on each address in the memory range from EDI to EDI+ECX.

4. Exemplary Graphics Device Driver

Figure 6:
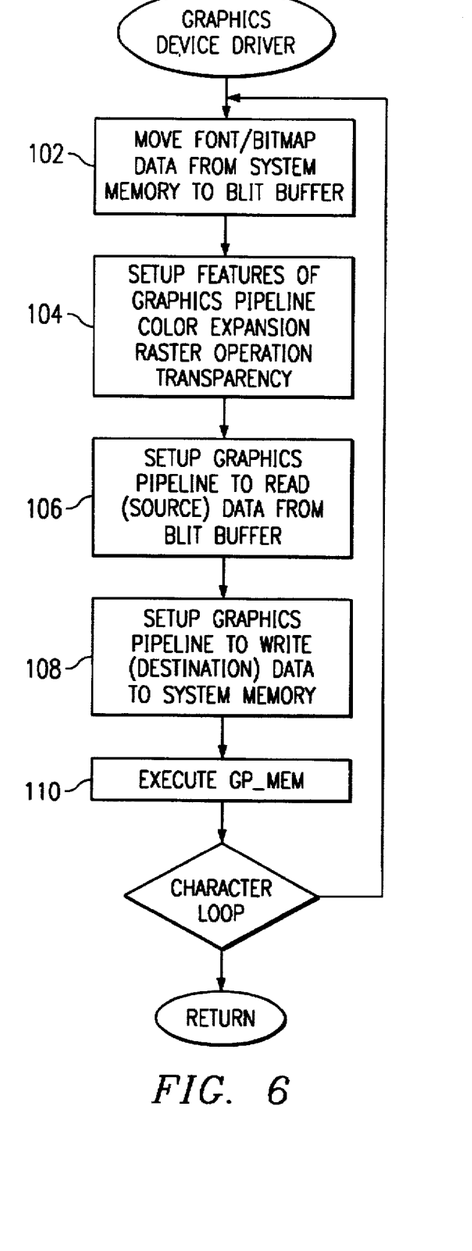
FIG. 6 is a flow diagram of a device driver that renders raster text to, and transfers memory bitmaps between, locations in system memory; and, FIG. 7 is a flow diagram of a device driver that performs a rendering primitive in accordance with the principles of the present invention.

Reference is now made to FIG. 6 which depicts a flow diagram of a device driver that renders raster text to, and transfers memory bitmaps between, locations in system memory 36. For each character which is to be displayed on display 23, step 102 loads raster font or bitmap information from system memory 36 into the blit buffer of the L1 cache 18. The preferred method of performing this step is described in co-pending U.S. patent application Ser. No. 08/540,300, Attorney's Docket No: CX00246, filed Oct. 06, 1995, entitled "Data Transfer With Cacheability Control", assigned to the Assignee of the present invention, and having been herein incorporated by reference. Those skilled in the art, with the aid of the present disclosure, will recognize other methods of moving fonts or bitmaps from the system memory 36 to the blit buffer without departing from the scope of the present invention.

At step 104, the graphics pipeline 22 is set up with features such as vector drawing, rectangle drawing, source color expansion, and transparency. At step 106, the graphics pipeline 22 is set to read (source) data from the blit buffer. At step 108, the graphics pipeline 22 is set to write (destination) data to system memory 36, however, no graphics data is transferred until step 110. At step 110, the GP_MEM instruction is executed which invokes the CPU core 14 to recursively move the data from the graphics pipeline 22 to system memory 36. Protection and privilege checking are performed for each virtual-to-physical address within the region of system memory 36 being written. The GP_MEM instruction is recursively executed by the graphics device driver for each raster character being displayed.

Figure 7:
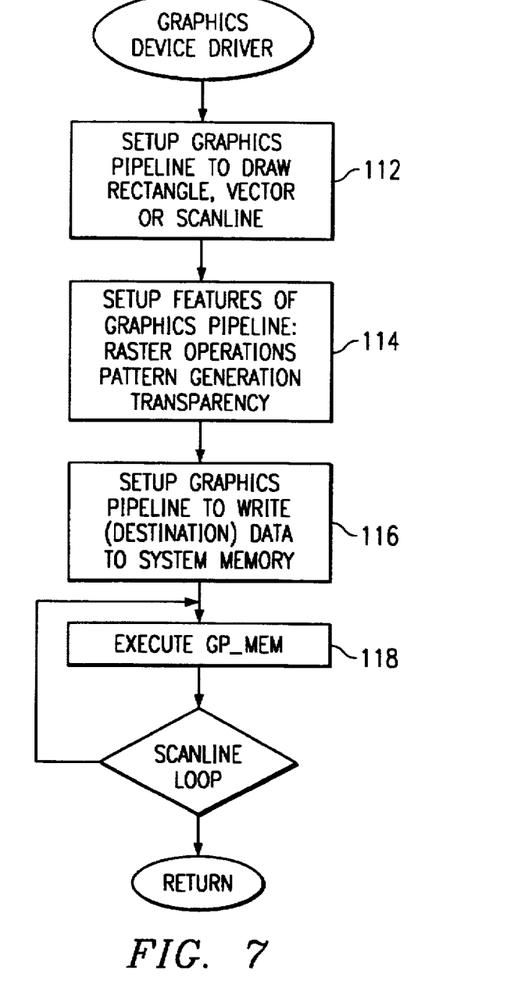

Reference is now made to FIG. 7 which depicts a flow diagram of a device driver that renders a graphics primitive in accordance with the principles of the present invention. At step 112, the graphics pipeline 22 is set to draw vectors, rectangles, or scanlines to system memory 36. The graphics device driver provides the size and location of each primitive to the graphics pipeline 22. At step 114, the features of the graphics pipeline 22 are set including raster operation, color or monochrome pattern, color expansion, and transparency as specified by the application program. Any settable feature of the graphics pipeline 22 may be applied to raster data originating in the graphics pipeline 22 which then flows through to the bitmap stored in system memory 36.

At step 116, the graphics pipeline 22 is set to write data to system memory 36 however, no graphics data is transferred until step 118. At step 118, the graphics device driver executes the GP_MEM instruction which invokes the CPU core 14 to recursively move data from the graphics pipeline 22 to system memory 36. The size of the primitive being rendered is programmed to be the same in the GP_MEM instruction and the graphics pipeline 22. Protection and privilege checking are performed for each virtual address being written within the region system memory 36. The GP_MEM instruction is recursively executed by the graphics display driver for each scanline.

5. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the claims.

What is claimed is:

1. A method of transferring raster text from a graphics subsystem to a system memory with a processor comprising steps of:
    (a) loading font information from the system memory into a blit buffer for each text character to be displayed;
    (b) setting the graphics subsystem to read font information from the blit buffer;
    (c) setting the graphics subsystem for source color expansion and to write raster text to the system memory; and,
    (d) without using a frame buffer as intermediate storage, moving the raster text directly from the graphics subsystem to the system memory while performing protection and privilege checks with the processor for each virtual address within the system memory being written.

2. A method of rendering a primitive in a graphics subsystem comprising steps of:
    (a) from an application program executed on a processor, providing size and location information of the primitive to the graphics subsystem;
    (b) from the application program, setting raster operation, color or monochrome pattern, color expansion, and transparency in the graphics subsystem;
    (c) setting the graphics subsystem to write data to system memory; and,
    (d) without using a frame buffer as intermediate storage, recursively moving a block of data directly from the graphics subsystem to system memory while performing protection and privilege checking with the processor for each virtual-to-physical address being written within the system memory.

3. A system of transferring raster text from a graphics subsystem to a system memory with a processor comprising:
    (a) means for loading font information from the system memory into a blit buffer for each text character to be displayed;
    (b) means for setting the graphics subsystem to read information from the blit buffer;
    (c) means for setting the graphics subsystem for source color expansion to write raster text to the system memory; and,
    (d) means, without using a frame buffer as intermediate storage, for moving the raster text directly from the graphics subsystem to the system memory while performing protection and privilege checks with the processor for each virtual address within the system memory being written.

4. A system of rendering a primitive in a graphics subsystem comprising:
    (a) means for providing size and location information of the primitive to the graphics subsystem from an application program executed on a processor;
    (b) means for setting raster operation, color or monochrome pattern, color expansion, and transparency in the graphics subsystem from the application program;
    (c) means for setting the graphics subsystem to write data to system memory; and,
    (d) means, without using a frame buffer as intermediate storage, for recursively moving a block of data directly from the graphics subsystem to system memory while performing protection and privilege checking with the processor for each virtual-to-physical address being written within the system memory.

5. A processing system comprising:
    (a) a processor;
    (b) system memory coupled to the processor;
    (c) a blit buffer coupled to the processor; and,
    (d) a graphics subsystem coupled to the processor wherein
        (i) font information is loaded from the system memory into the blit buffer for each character to be displayed,
        (ii) the graphics subsystem is set to read font information from the blit buffer,
        (iii) the graphics subsystem is set for source color expansion and to write raster text to the system memory, and,
        (iv) without using a frame buffer as intermediate storage, the raster text is moved directly from the graphics system to the system memory while performing protection and privilege checks with the processor for each virtual-to-physical address being written within the system memory.

6. A processing system comprising:
    (a) a processor;
    (b) system memory coupled to the processor;
    (c) a blit buffer coupled to the processor; and,
    (d) a graphics subsystem coupled to the processor wherein
        (i) size and location information of a graphic primitive is provided to the graphics subsystem from an application program;
        (ii) raster operation, color or monochrome pattern, color expansion, and transparency is set in the graphics subsystem from the application program;
        (iii) the graphics subsystem is set to write data to system memory; and,
        (iv) without using a frame buffer as intermediate storage, a block of data from the graphics subsystem is recursively moved to system memory while performing protection and privilege checking with the processor for each virtual-to-physical address being written within the system memory.

7. A computer system comprising:
    (a) a motherboard;
    (b) a central processing unit disposed on the motherboard;
    (c) memory disposed on the motherboard and coupled to the central processing unit; and,
    (d) a graphics subsystem coupled between the central processing unit and the memory wherein
        (i) font information is loaded from the memory into a blit buffer for each text character to be displayed,
        (ii) the graphics subsystem is set to read font information from the blit buffer,
        (iii) the graphics subsystem is set to write raster text to the system memory, and,
        (iv) without using a frame buffer as intermediate storage, the raster text is moved directly from the graphics system to the system memory while performing protection and privilege checks with the central processing unit for each virtual-to-physical address being written within the system memory.

8. A computer system comprising:
(a) a motherboard;
(b) a central processing unit disposed on the motherboard;
(c) memory disposed on the motherboard and coupled to the central processing unit; and,
(d) a graphics subsystem coupled between the central processing unit and the memory wherein
  (i) size and location information of a graphic primitive is provided to the graphics subsystem from an application program;
  (ii) raster operation, color or monochrome pattern, color expansion, and transparency is set in the graphics subsystem from the application program;
  (iii) the graphics subsystem is set to write data to the memory; and,
  (iv) a block of data from the graphics subsystem is recursively moved by the central processing unit to the memory while performing protection and privilege checking with the central processing unit for each virtual-to-physical address being written within the memory without using a frame buffer as intermediate storage.

9. In a computer having a motherboard, a central processing unit, a subsystem, and system memory external to the central processing unit, a method of transferring raster text comprising the steps of:
(a) loading font information from the system memory into a blit buffer for each text character to be displayed;
(b) setting the graphics subsystem to read font information from the blit buffer;
(c) setting the graphics subsystem for source color expansion and to write raster text to the system memory; and,
(d) without using a frame buffer as intermediate storage, moving the raster text directly from the graphics subsystem to the system memory while performing protection and privilege checks with the central processing unit for each virtual-to-physical address within the system memory being written.

10. In a computer having a motherboard, a central processing unit, a subsystem, and system memory external to the central processing unit, a method of performing a primitive in a graphics subsystem comprising steps of:
(a) from an application program, providing size and location information of the primitive to the graphics subsystem;
(b) from the application program, setting raster operation, color or monochrome pattern, color expansion, and transparency in the graphics subsystem;
(c) setting the graphics subsystem to write data to system memory; and,
(d) without using a frame buffer as intermediate storage, recursively moving a block of data from the graphics subsystem to system memory while performing protection and privilege checking with the central processing unit for each virtual-to-physical address being written within the system memory.

* * * * *